Feb. 23, 1926.

F. H. CAMPBELL 1,574,416

CARRIER OR HOLDER FOR ARTIFICIAL BAIT

Filed April 17, 1925

INVENTOR
F. H. Campbell.
BY
ATTORNEYS

Patented Feb. 23, 1926.

1,574,416

UNITED STATES PATENT OFFICE.

FRANK HOWARD CAMPBELL, OF LEWISBURG, WEST VIRGINIA.

CARRIER OR HOLDER FOR ARTIFICIAL BAIT.

Application filed April 17, 1925. Serial No. 23,891.

*To all whom it may concern:*

Be it known that I, FRANK H. CAMPBELL, a citizen of the United States, and a resident of Lewisburg, in the county of Greenbrier and State of West Virginia, have invented certain new and useful Improvements in Carriers or Holders for Artificial Bait, of which the following is a specification.

My present invention relates generally to holders for fishermen's use for the purpose of supporting and carrying a series of artificial minnows or lures which on account of their provision with numbers of gang hooks, are ordinarily difficult to convey while fishing and in such manner as to provide for their ready interchange.

A primary object of my invention is the provision of a simple inexpensive carrier which the fisherman may carry upon his person and in which a series of artificial minnows may be supported and protected against danger of fouling and in such manner as to permit of their ready release for selected individual use when the carrier is open.

A further object is the provision of a simple comparatively inexpensive device which may be readily carried upon the person, which may be easily packed away, and which will be effective and efficient as a protector and supporter for artificial minnows and lures at all times.

Figure 1:
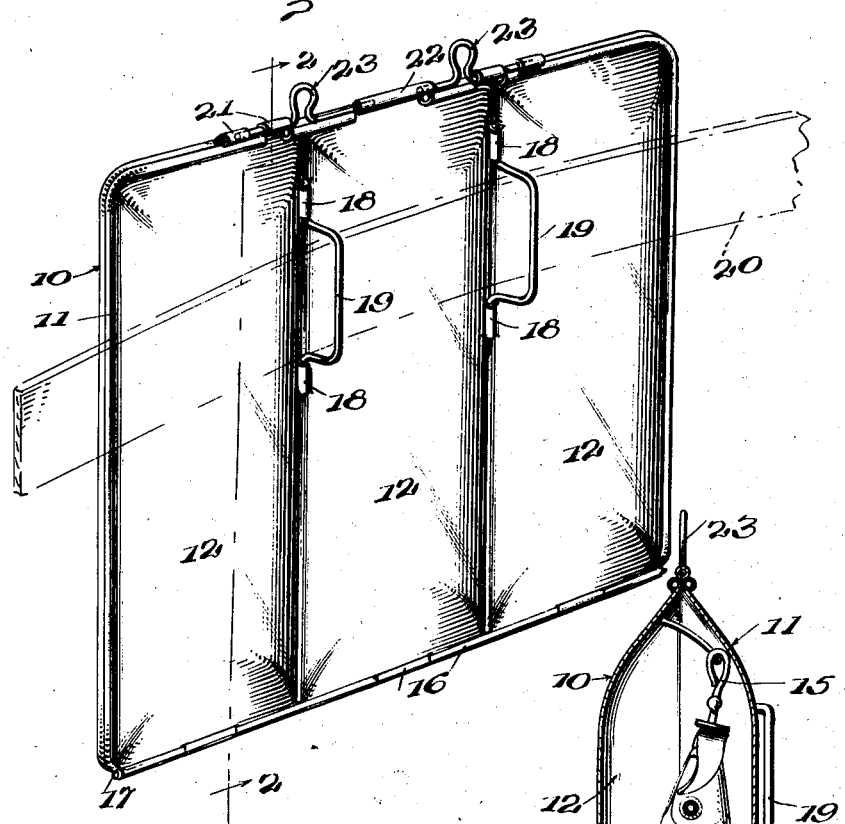
Figure 3:
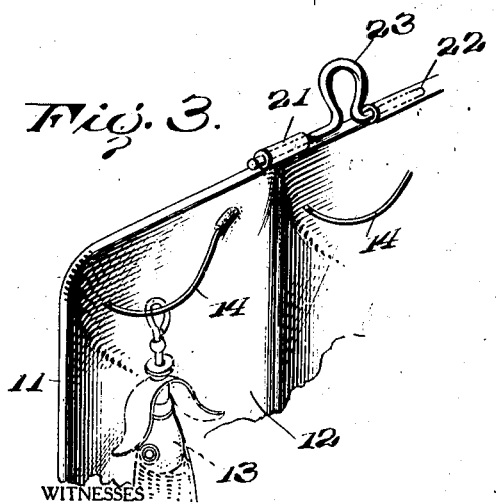
Figure 2:
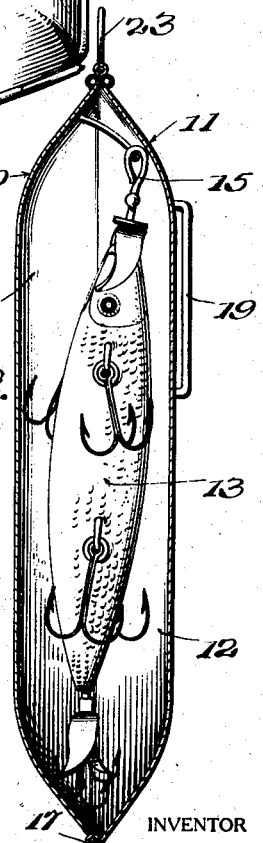

In the accompanying drawing which illustrates my present invention and forms a part of this specification, Figure 1 is a perspective view of my improved carrier complete, Figure 2 is a vertical transverse section taken substantially on the line 2—2 of Figure 1, and Figure 3 is a detail perspective view looking at the inner face of one of the sections.

Referring now to these figures, my invention proposes a carrier including two sections 10 and 11 which come into face to face contact when closed, and which are so shaped as to permit of readily stamping the sections from sheet metal, fiber or other suitable material. Each of the sections is formed with spaced parallel indented or dished portions 12, which when together with the sections closed, form compartments for the reception of the artificial minnows or lures, one of which is seen at 13 in Figure 2, the contacting portions of the sections between such compartments insuring the separate holding of the minnows or lures and the prevention of their fouling or entanglement due to the movements of the user from place to place. One of the sections has within each of its indented or dished portions 12 and at the upper end thereof a freely extending spring holder or arm 14 securely fastened at one end to the wall of the section, with its opposite end projecting outwardly beyond the dished portion 12 so that it is an easy matter to insert upon this holder or arm the upper hook 15 of an artificial minnow or lure, as well as to remove the same therefrom. When the two sections are closed, the holder or arm 14 extends into the corresponding dished portion 12 of the other section 11 and into contact with the wall of the section so that while the sections are closed the artificial minnows or lures 13 cannot become detached, although when the sections are opened it becomes a simple easy matter to select the desired minnow and remove the same from the carrier for use.

Along their lower edges, at the lower ends of the several compartments formed by the dished or indented portions 12 the sections 10 and 11 are provided with cooperating tubular portions 16 adapted to form a hinge in connection with a hinge pin 17, the several compartments extending at right angles to the hinge as plainly seen so that when the section 10 is dropped on the hinge to open position, the several artificial minnows 13 will be fully exposed in upright position while still in engagement with the holding arms 14.

Externally thereof and between its indented or dished portions 12 the section 11 has vertically spaced bearing portions 18 to receive the out-turned ends of U-shaped belt engaging loops 19, whereby the carrier may be supported upon a belt 20 indicated in dotted lines in Figure 1, upon the person of the user.

At their upper edges, the sections 10 and 11 are provided with laterally spaced tubular members 21 adapted to come into alinement when the sections are closed, and section 11 has at its upper edge a centrally disposed tubular portion 22, the latter receiving the inner extensions of catch members having upstanding handle loops 23 and having outer extensions for projection through the tubular portions 21 when the catches are shifted away from one another.

Thus with the carrier supported upon the belt of the user it becomes a simple matter to press the catches toward one another in the guides of the section 11 so that the section 10 will be freed and may fall or swing downwardly to open position, exposing the several artificial minnows to view. After selecting the minnow desired, it is a simple matter for the operator to detach the same as the outer ends of the several curved holding arms 14 are at this time projecting freely outside of the indented or dished portion of the section 11. Selection and removal of one of the artificial minnows may be accomplished without danger of displacing the others on account of the normal protection thereof against fouling or entanglement. After selection and removal of the selected bait or lure has been accomplished, it is an easy matter to swing the section 10 upwardly to closed position and then shift the catches away from one another so as to lock the sections against danger of displacement.

I claim:—

1. A holder for artificial minnows, consisting of a two-part casing, the parts of which are hingedly connected along one edge of the casing, detachable fastening means in connection with the opposite edges of the parts, said casing parts having indented or dished portion paralleling one another in a direction at right angles to the hinged edges of the parts and forming separate minnow compartments when the casing is closed, and belt engaging loops whereby the carrier may be supported on the person in use, said loops being mounted externally of one of the casing parts and disposed parallel with and between the indented or dished portions thereof.

2. A holder for artificial minnows, consisting of a two-part casing, the parts of which are hingedly connected along one edge of the casing, detachable fastening means in connection with the opposite edges of the parts, said casing parts having indented or dished portions paralleling one another in a direction at right angles to the hinged edges of the parts and forming separate minnow compartments when the casing is closed, means within the said compartments carried by one of the casing parts and forming supports for artificial minnows arranged to hold the latter in readily releasable position when the casing is opened, and belt engaging loops externally of the casing and connected to one of the parts thereof between its said indented or dished portions.

3. A holder for artificial minnows consisting of a two-part casing of which the parts are hinged along one edge and provided with dished or indented portions forming separate minnow holder compartments when the casing is closed, paralleling one another in a direction at right angles to the hinged edge of the casing, and a curved minnow supporting arm in each compartment secured at one end within the upper end of the indented or dished portion of one of the casing parts and projecting at its free end for engagement with the opposing indented portion when the casing is closed.

FRANK HOWARD CAMPBELL.